Oct. 30, 1951 H. SERVIS 2,572,956
METHOD OF SECURING LEADS TO COMMUTATORS
Filed Dec. 5, 1946
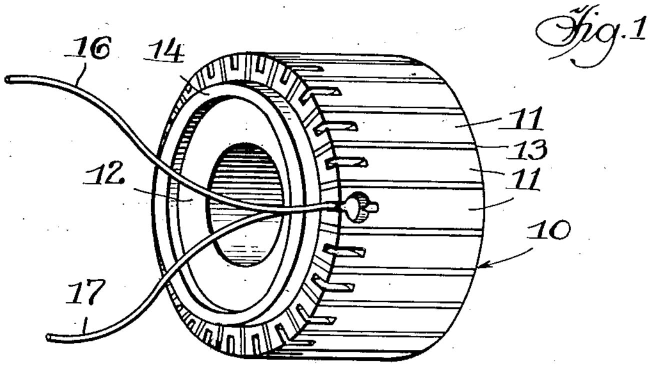
Fig. 2
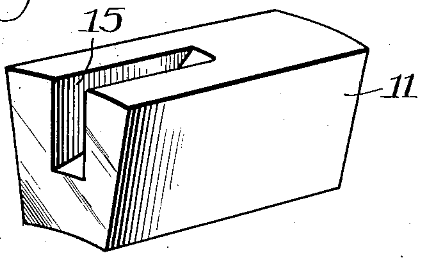
Fig. 3
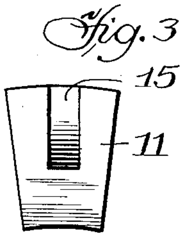
Fig. 4
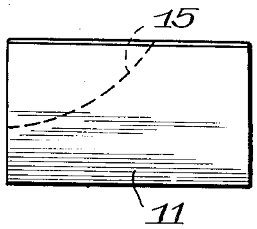
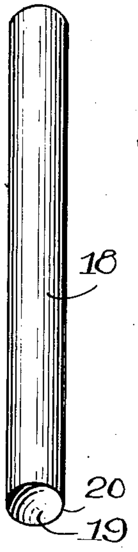
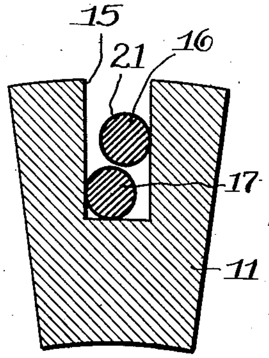
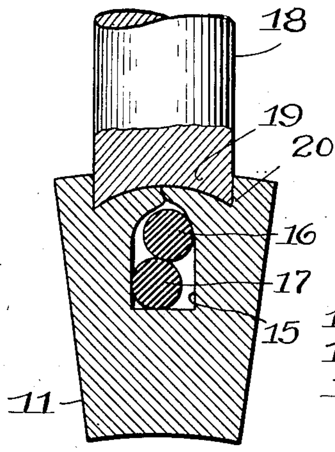
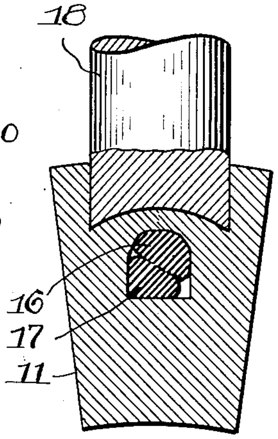
Fig. 5 Fig. 6 Fig. 7
Fig. 8
INVENTOR.
Hoyt Servis
BY
Zabel and Gritzbaugh
Attys.

Patented Oct. 30, 1951 2,572,956

UNITED STATES PATENT OFFICE 2,572,956

METHOD OF SECURING LEADS TO COMMUTATORS

Hoyt Servis, Racine, Wis., assignor to The Dumore Company, Racine, Wis., a corporation of Wisconsin Application December 5, 1946, Serial No. 714,283

4 Claims. (Cl. 29—155.54)

This invention relates to an improved method of assembling armature coil leads to commutator segments or the like.

According to the present practice, an insulated lead from each of two adjoining coils in the armature of an electric motor is secured to a commutator segment by first removing the wire insulation by mechanical or chemical means; second, placing the leads in a slot of the commutator segment; third, swedging the copper of the commutator segment around the lead; and fourth, by soldering the parts together.

The use of solder is objectionable for the reason that, under the conditions of high temperature and high speed usually present in electrical motors, the solder often softens to the extent that centrifugal force throws the solder away from the commutator, thus resulting in a poor electrical and mechanical joint between the armature windings and the commutator. The thrown solder often causes electrical grounds to occur on other parts of the motor which surround the commutator.

The removal of the magnet wire insulation is a costly and usually damaging operation. When removed by mechanical means, the copper is nicked and scratched, often resulting in wire failure under the conditions of vibration normally present in electric motors.

The swedging or staking operation referred to consists in the application of a swedging tool to the surface of the commutator segment adjacent the slot. The swedging tool is in the form of a small hammer which is caused to reciprocate through a comparatively small throw at a comparatively high rate of speed. This swedging operation causes a portion of the copper to be forced inwardly down and around the bare copper leads which are disposed in the slot, so as to secure the leads in the slot temporarily until soldering can be effected. Repeated blows by the swedging tool are required in order to hold the leads in the slot.

When the leads are swedged or staked to the commutator segments without prior removal of the insulation, the electrical joint provided by the subsequent soldering operation is often poor since the cold working of the copper by the swedging tool is insufficient to puncture or remove the insulation. Therefore, prior removal of the insulation is necessary with present methods of swedging.

The soldering operation, in turn, necessitates two additional steps: that of wire brushing of the commutator slots before soldering, and that of wire brushing after soldering.

The first wire brushing operation is necessary to remove any oxidation on the slot walls, which oxidation would otherwise prevent the making of satisfactory soldered connections. The second wire brushing operation is necessary in order to remove loose globules of the solder, and in particular, to remove any solder bridges across the insulating strips which separate adjoining commutator segments.

In summary, in the assembling method currently practiced, two operations are necessary prior to the connecting operation itself—namely, removal of insulation from the armature coil leads, and secondly, wire brushing of the slotted segments to remove oxidation. The connecting operation itself consists of four steps: first, laying the wire in, second, swedging over the slots, third, a solder dip and fourth, wire brushing to remove excess solder.

It is an object of my invention to provide a method of assembling armature coil leads to commutator segments which eliminates the operation of insulation removal, the operation of soldering the parts, and the two wire brushing operations which are necessitated by the use of the soldering operation.

The method of my invention contemplates causing the copper along the edges of the slot of the commutator to flow downwardly and inwardly by the continuous application of heat and pressure, the heat being developed frictionally by a spinning tool. The heat is developed simultaneously with the application of the pressure which causes the flow of the copper, and this apparently provides an intimate association of the copper of the commutator segment with the copper of the coil leads in a good mechanical and electrical connection. The presence or absence of insulation material on the coil leads, and the presence or absence of an oxide coating on the slot walls of the segment apparently has no effect on the type of mechanical and electrical contact.

I have found that the electrical connection provided by such spinning operation is not only as good as the soldered connection previously used, but is uniformly good. That is, in the production of armatures the connections of which are made according to my invention, the rejection rate is lower than the rejection rate of those assembled by the soldering method. By the substitution of one step for four steps, much more uniform results can be obtained.

In summary, the method of my invention comprises merely the two steps of laying the wire in the slots, and the spinning operation. Insulation removal, the solder dip and the two wire brushing steps are eliminated.

As an example of a preferred method of practicing my invention, reference is made to the accompanying figures which form a part of this specification, and in which like reference numerals designate like parts.

Fig. 1 is a perspective view of a commutator in which one pair of leads have been attached to one segment according to my invention;

Fig. 2 is a perspective view of a single slotted commutator segment;

Fig. 3 is a front view of the segment shown in Fig. 2;

Fig. 4 is a side view of the segment of Fig. 2;

Fig. 5 is an enlarged sectional diagram of a segment with two leads positioned in the slotted portion thereof, preparatory to the spinning operation;

Fig. 6 is a diagram similar to Fig. 5, but showing the parts at an intermediate stage of the spinning operation;

Fig. 7 is a diagram similar to Figs. 5 and 6, but showing the parts at the conclusion of the spinning operation; and Fig. 8 is a perspective view of the spinning tool.

With reference now to the drawings, the reference numeral 10 designates a commutator generally which is made up of a plurality of copper segments 11 arranged around a suitable core 12. The segments 11 are separated from each other by insulating strips 13, and are separated from the core 12 by an insulating sleeve 14. Each segment 11 is provided with a slot 15, which may be suitably formed therein in any desired manner, as shown in Figs. 2, 3 and 4.

The leads 16 and 17 may be provided with insulation 21 which may be in the form of a coating, or which may be fibrous. The leads, with the insulating coating 21, which is indicated diagrammatically in Fig. 5 only, are disposed in the slot 15. A spinning tool 18 is then brought into engagement with the upper surface of the segment 11. The spinning tool is shown in detail in Fig. 8 and comprises a substantially cylindrical shank having a concave under surface or end 19. The intersection of the concave end 19 with the cylindrical surface provides a circular cutting edge 20.

The spinning tool is mounted in a suitable drill press and is caused to rotate at a high speed, such as a speed in excess of five thousand revolutions per minute. The spinning tool is preferably of a diameter of approximately three times the width of the slot. As the spinning tool is forced, while rotating, into the segment as shown in Fig. 6, it causes the copper in its path and along the walls of the slot to be crowded, or to flow inwardly and downwardly, thereby gradually closing up the slot. Continued application of pressure to the spinning tool causes the leads 16 and 17 to be crowded together and against the bottom and lower portion of the walls of the slot, and also to be deformed.

The exact mechanics of the operation are not at present fully understood, but it is believed that the process operates in substantially the same manner as diagrammatically illustrated in Figs. 5, 6 and 7. It appears likely that some deformation of the copper leads 16 and 17 occurs which may result in the breaking of the enamel coating 21 in order to provide a good electrical contact of copper to copper. Another possible explanation is that the heat developed by the friction of the spinning tool may cause softening and displacement of the coating, when a coating is used.

However, good electrical and mechanical contact is obtained when the insulation comprises glass or cotton fibers. As an example of the types of coating used, I have found that a plain enamel coating, a silicone coating, or "Formex" or "Formvar" are all satisfactory. "Formex" and "Formvar" are trade names for a product which purports to be manufactured under Patents Nos. 2,085,955, 2,114,877, and 2,307,588.

The end portion of the tool 18 is preferably formed of a high speed tool steel, or it may be tipped with Carboloy.

Due to the fact that the leads 16 and 17 are disposed along the curved bottom of the slot 15, the spinning tool 18 engages and cuts off the ends of the leads, and the tool is retracted before such time as it comes into engagement with those portions of the leads which lie between the armature coils and the portions which are secured in the slot. If the segments are slotted so that the bottom of the slot is parallel to the armature axis, as is often the case when a riser type of segment is used, then the tool is caused to bite into the segment at an angle to the bottom of the slot, to the end that the free ends of the leads may be severed in like manner.

The method of my invention is applicable whether one, two or more than two leads are to be secured in a single slot.

Although only a preferred embodiment of my invention is shown and described herein, it is understood that various modifications and changes may be made therein without departing from the spirit of my invention.

I claim:

1. The method of closing up the slot in a copper commutator segment so as to provide mechanical and electrical contact with an unstripped insulated lead which is disposed in the bottom of said slot which comprises the step of applying localized frictional heat and pressure to a circular area which spans the slotted surface of said commutator segment, said pressure being exerted in a direction which causes copper in that area to flow inwardly toward the center of said slot and downwardly over and around said lead, and continuing the application of said frictional heat and pressure until the lead is deformed whereby the insulation thereof is broken and a good electrical contact is established.

2. A method of securing an insulated lead to a slotted commutator segment comprising the steps of inserting said lead into the slotted portion of said segment without removing the insulation therefrom, applying a spinning tool to that surface of said segment which is slotted, said spinning tool being of a diameter greater than the width of said slot, causing said spinning tool to bite into said slotted segment to deform a portion of said segment and to cause a portion of the material forming the walls of said segment to be crowded inwardly and downwardly around said lead, and continuing the downward pressure on said spinning tool until the lead is deformed whereby the insulation thereof is broken and a good electrical contact between the material of said segment and said lead is established.

3. A method of securing a lead provided with an insulating coating to a slotted commutator segment in electrically conducting relationship comprising the steps of inserting said lead into the slotted portion of said segment without removing said coating, applying a rotating tool to the surface of said segment which is slotted, said rotating tool being of a diameter greater than the width of said slot and having a circular cutting edge, applying axial pressure to said rotating tool to cause a portion of the material forming the walls of said slot to flow inwardly and downwardly into said slot and around said lead and into contact therewith, and continuing the downward pressure on said rotating tool until the lead is deformed whereby the insulation is broken and a good electrical contact is established.

4. A method of securing a lead to a commutator segment having a slot intersecting the top and at least one side surface of said segment by the use of a spinning tool having a concave under surface and a circular cutting edge, comprising the steps of disposing said lead along the bottom of said slot, applying a spinning tool to the top surface of said segment and spanning said slot, orienting said spinning tool at an angle of less than 90 degrees with respect to the disposition of said lead, causing said spinning tool to rotate at a high speed, applying axial pressure thereto, thereby causing said spinning tool to bite into said slotted segment, and arresting the downward movement of said spinning tool after the time that said cutting edge has engaged said lead at one point and severed it, but prior to the time that said cutting edge has engaged said lead at a second point.

HOYT SERVIS.

REFERENCES CITED

The following references are of record in the file of this patent:

UNITED STATES PATENTS

| Number | Name | Date |
|---|---|---|
| 1,292,277 | Edison | Jan. 21, 1919 |
| 1,744,274 | Lotter | Jan. 21, 1930 |
| 2,033,633 | Hawksley | Mar. 10, 1936 |
| 2,127,050 | Smith | Aug. 16, 1938 |
| 2,188,423 | Andrews | Jan. 30, 1940 |
| 2,353,054 | Liss | July 4, 1944 |
| 2,414,598 | Klipper | Jan. 21, 1947 |
| 2,427,072 | Rubin | Sept. 9, 1947 |

FOREIGN PATENTS

| Number | Country | Date |
|---|---|---|
| 572,789 | Great Britain | Oct. 24, 1945 |